United States Patent [19]

Parker

[11] 4,334,583
[45] Jun. 15, 1982

[54] MULTI-PURPOSE LIGHT DUTY GARDEN TOOL

[76] Inventor: George A. Parker, 3810 Carpenter St., S.E., Washington, D.C. 20020

[21] Appl. No.: 225,998

[22] Filed: Jan. 19, 1981

[51] Int. Cl.³ .......................... A01B 1/20; A01B 1/14
[52] U.S. Cl. ................................. 172/375; 172/380; 172/381
[58] Field of Search ............... 172/371, 375, 378, 380, 172/381; 56/400.21; 7/114, 116; 30/329; 294/49, 51, 52, 55.5, 57; D8/6, 9, 10, 11, 13

[56] References Cited

U.S. PATENT DOCUMENTS

| | | | |
|---|---|---|---|
| D. 25,667 | 6/1896 | Lipe | D8/9 |
| 213,584 | 3/1879 | Munson | 172/375 |
| 403,655 | 5/1889 | Gates | 172/381 |
| 1,099,958 | 6/1914 | Wood | 294/57 X |
| 1,730,759 | 10/1929 | Crane | 7/116 X |
| 2,429,120 | 10/1947 | Brandt | 172/375 |
| 2,555,752 | 6/1951 | Merola | 294/51 |
| 2,594,598 | 4/1952 | Timmins | 294/51 |
| 3,020,077 | 2/1962 | Rokos | 294/55.5 |
| 3,156,305 | 11/1964 | Nash | 172/381 |
| 3,226,149 | 12/1965 | McJohnson | 294/50 |
| 3,261,410 | 7/1966 | Osborn | 172/371 |
| 3,592,272 | 7/1971 | Perez | 172/375 |
| 3,868,775 | 3/1975 | Anderson | 30/329 |

Primary Examiner—Richard T. Stouffer
Attorney, Agent, or Firm—LeBlanc, Nolan, Shur & Nies

[57] ABSTRACT

A light-weight, multi-purpose light-duty yard tool made with a small sheet metal blade part shaped like a truncated triangle with the widest part at the front and the narrow edge at the heel or rear end. The front side portions are slightly cupped as is the wide front edge, to enable use as a shovel. The front edge has cutouts with sharpened edges providing raking tines to be used as a pushing cutting member. The forward portions of the side edges are sharpened, enabling use as an edging or slicing tool, while the rear portions of the side edges are flanged for strength. A tang piece, riveted to the heel part of the blade, provides a device for attaching the blade to a lightweight wood handle of medium length. The tool length preferrable is the distance from the users waist to the ground.

7 Claims, 5 Drawing Figures

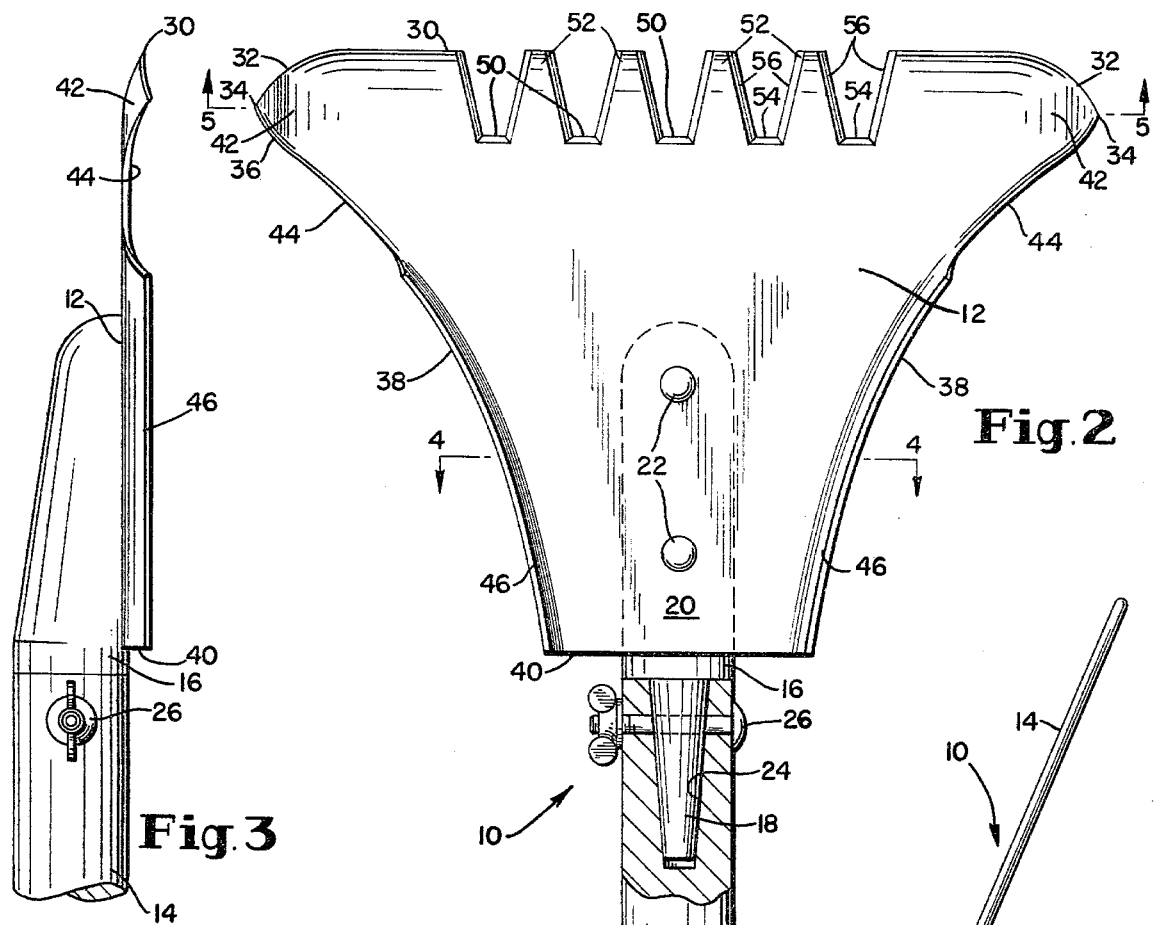
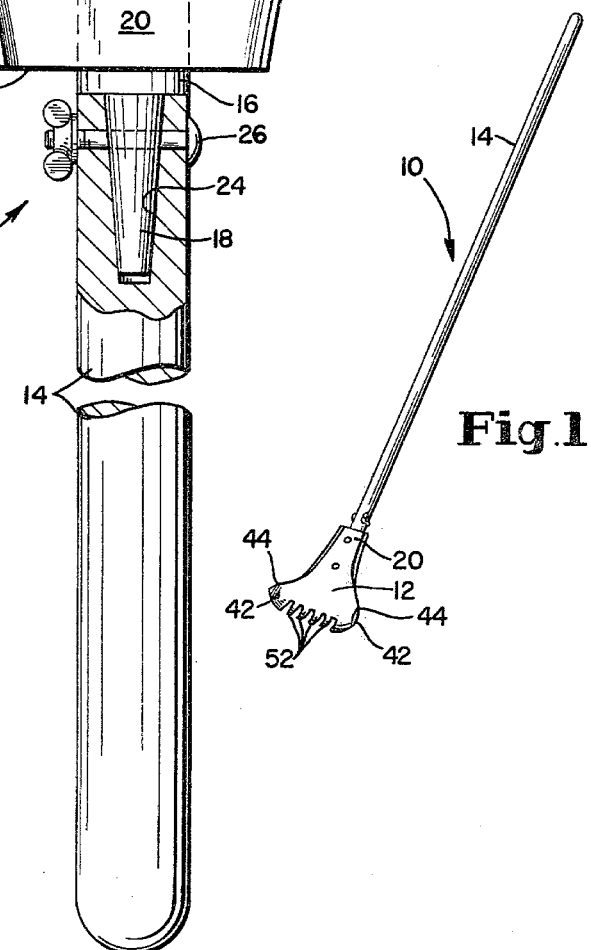
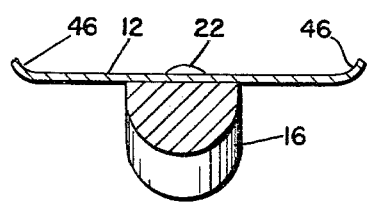
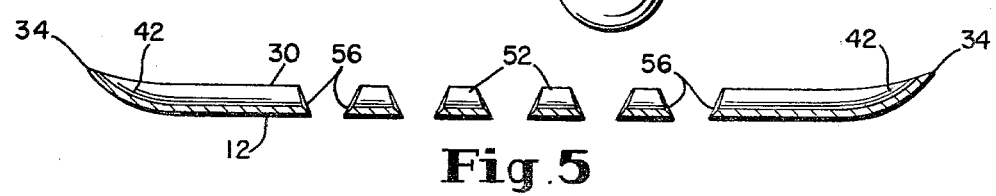

MULTI-PURPOSE LIGHT DUTY GARDEN TOOL

BACKGROUND OF THE INVENTION

The present invention relates to a multi-purpose medium size garden tool developed to serve the need for one tool, easily carried and capable of accomplishing a variety of small chores around a yard which can be attended to as one walks around the premises. It is a lightweight implement with a medium length handle and a one piece tool end, a small sheet metal blade configured for light use as a rake, shovel, slicer, push cutter, edger and light cultivation. The handle must be sufficiently long to enable reaching under shrubs but not so long as to be cumbersome or awkward to use when one is kneeling or stooping to do the chore.

The prior art has proposed numerous light duty garden and lawn tools, but none, to applicant's knowledge, is constructed in the manner and shape of the present invention. While some are designed to perform several functions none is designed to function for all of the multiple uses or manners of use of the present invention.

Insofar as applicant is aware, the most pertinent prior art patents are the following: G. M. Timmons, U.S. Pat. No. 2,594,598, directed to a garden tool which made from light sheet metal, has two front serrated sharp edged prongs 8, sharp straight side edges 11 and a forward central cutting notch 9; and Perez Patent U.S. Pat. No. 3,592,272 disclosing a multipurpose garden tool which can be used as a shovel, a chopping cutter, a push cutter and a pulling tool, with what is called raking teeth. However, the unit is flat and does not have the contour shape or configuration to accomplish the multiple light-duty functions in the manner of applicant's tool.

SUMMARY OF THE INVENTION

Accordingly, a primary object of the present invention resides in the provision of a light-duty multipurpose garden tool having a one-piece sheet metal blade with a medium length lightweight handle pole, the blade being configured to function for light-duty uses as the following: shovel, rake, border edger, push cutter, side slicer and light cultivator of loose soil.

Features of the unique tool are its single small blade with a wooden handle making it easy to clean up and/or cultivate around hard to reach places, such as; behind trees and shrubbery growing close to a building or fence, beneath low branching shrubbery, and in small garden plots. A morning outdoor check of a yard often reveals the presence of animal deposits on the lawn or near shrubbery, small bits of paper of all types, containers and other forms of litter along the curbside. The implement, because of its shoveling, spearing and raking capability, is ideally suited for such cleaning-up tasks. A multi-tined blade with curved tip is designed with plural front edge teeth having cutting edges which are used for cutting as well as uprooting weeds and breaking up the soil around established garden plots and shrubbery. Protruding ends, or pikes, on each side of the blade are used for edging along the border of the garden as well as for slicing cuts to remove small shoots and weeds.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings, in which:

FIG. 1 is a perspective view of the yard tool of this invention;

FIG. 2 is a top plan view, scaled full-size, of the yard tool;

FIG. 3 is a partial side view of the tool shown in FIG. 2;

FIGS. 4 and 5 are section views taken respectively on lines 4—4 and 5—5 of FIG. 2.

DESCRIPTION OF PREFERRED EMBODIMENT

The tool 10, shown in FIG. 1, was developed for light duty chores and to that end has been constructed as a lightweight unit with a special, rather small blade portion 12 and a medium length handle 14. The total height of the tool is approximately 120 cm (40 inches), reaching from the ground to about the height of a user's waist. The blade part 12 is made from a truncated triangular piece of sheet metal, preferably steel sheet, approximately 1.6 mm (1/16 inch) in thickness, having qualities of stiffness, ability to retain its shape, resistance to bending and capable of being sharpened to a cutting edge at desired locations. The handle can be made from lightweight material, such as wood or aluminum, with a 25 mm (1 inch) diameter. A tang piece 16 of suitable metal with projecting tang 18 is rigidly fastened to the heel 20 of the blade by suitable fasteners, e.g., rivets or screws 22. The tang 18 is spigotted and wedged into an appropriate bore 24 in the end of the handle and positively secured by a cross bolt and nut arrangement 26 or a rivet, in a conventional manner, and a ferrule can be used if desired.

The blade 12 is constructed to enable multiple light duty uses around a yard and under and around shrubs. While it can be used for light cultivation, it is not intended for principle use as a digging or spading implement.

The plane shape of blade 12 is clearly depicted in FIG. 2, having a wide forward part, and a narrow width heel 20. Its front end 30 lies essentially on a straight line, each end of which is curved through a small rearwardly curved arc 32 of about 80° to the points of maximum width, 140 mm (5½ inches), the section line where FIG. 5 is taken. From the points 34 of maximum width, each side slants inward with a short convex arc 36 and a long slight concave curvature 38 to the rear edge 40 of the heel.

The major area of the blade 12 is flat, relative to the longitudinal axis of the pole handle, or planar, and has certain selected portions curved up from the flat planar area. The front edge 30 and the front side ends or pikes 42 are upwardly curved to provide a very slight scoop shape, such end shapes providing what can be termed slightly cupped end portions (pikes 42) at each side of the front portions of the blade; as is apparent in the views shown in FIGS. 3 and 5. For approximately ⅓ of the distance toward the heel 20 from the curved tips 42, each edge is substantially straight and is sharpened to a knife edge 44. The rear ⅔ of each side edge is bent upwardly to provide an edge flange 46 which enhances rigidity of the blade. The blade configuration with the upwardly curved or bent edges enables use of the tool as a small light-duty shovel or scoop.

An intermediate portion of straight front edge 30 located along a section substantially the same dimension as the width of the blade where the side flanges 46 start, includes several V-shaped cutouts 50 which form a plurality (four preferred) of tine-like elements 52 enabling the tool to be used as a light duty rake.

The bottoms 54 and side edges 56 of each front edge cutout 50 are beveled to a sharp cutting edge which enable use for light-duty push cutting of small growth such as weeds or shoots of plants.

The curved, or slanted, sharpened fore portions 44 on each side edge constitute small hook knives, useful for a slicing cut near the base of shrubs to remove small undesired growth. The side knife edge portions are also used for edging along the borders of garden plots and aroung the mulched area under bushes and shrubs.

The aforedescribed garden or yard tool is made of small size and the handle is of medium length, which permits reaching under shrubs and bushes but not so long as to be unwieldy for use by a person kneeling along the garden border or beside shrubs and bushes. This multiple purpose single tool of simple construction has the functional capability of light duty trimming, cleaning up, shoveling, raking and cultivating around established garden plots and shrubs, and being small and lightweight can be conveniently carried and used for the many minor chores which are needed during a daily outdoor check-up of the premises.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A light-weight, multi-purpose light-duty yard tool comprising a small sheet metal blade part secured to one end of a pole handle: said blade part being essentially planar and shaped like a truncated triangle, the wide part at the front and the narrow heel part at the rear, and the front being substantially wider than the heel part, the blade part having bent up side edge portions extending along a portion of the sides thereof from the heel part and providing a shovel aspect, said front having edge cutouts providing teeth for a rake function, forward portions of both of the side edges of said blade part, forward of the bent up side edge portions, being substantially free of the upward bending of the side edge portions, said forward portions also being sharpened to provide edging and slicing functions; the ends of said front edge have a rearwardly curving arc and the end portions including said curving arc and the terminal portions of the side edges are slightly cupped upwardly relative to said forward portions of said side edges; and means securing the heel of said blade part to said pole handle.

2. A yard tool as defined in claim 1, wherein a tang piece at the heel of said blade part provides a tang for attachment to the end of said pole handle.

3. A yard tool as defined in claim 1, wherein the edges of said front edge cut-outs are sharpened to provide structure for a push-cutting function.

4. A yard tool as defined in claims 1, 2 or 3 wherein the side edges of said blade part are bent up to provide a side flange extended along approximately the rearward ⅔ of the side edges and a major portion of the side edges of the blade forward of the side flanges constituting said sharpened forward portions.

5. A yard tool as defined in claim 4, wherein the end portions of said front edge of said blade part are slightly cupped in an upwardly direction.

6. A yard tool as defined in claim 1, wherein the blade part is sheet steel about four inches (100 mm) in length, the pole handle is wood, and the total length of the tool is approximately 120 cm.

7. A yard tool as defined in claim 1 wherein the side edges throughout essentially the major extent of their length have a concave curvature in plan form with forward slicing edges.

* * * * *

UNITED STATES PATENT AND TRADEMARK OFFICE
CERTIFICATE OF CORRECTION

PATENT NO. : 4,334,583
DATED : June 15, 1982
INVENTOR(S) : GEORGE A. PARKER

It is certified that error appears in the above-identified patent and that said Letters Patent are hereby corrected as shown below:

Column 2, line 41, change "plane" to --plan--.

Column 2, line 43, change "end" to --edge--.

Signed and Sealed this

Twenty-fourth Day of August 1982

|SEAL|

*Attest:*

*Attesting Officer*

GERALD J. MOSSINGHOFF

*Commissioner of Patents and Trademarks*